2,820,021

RESINS COMPRISING TETRALLYLAMIDES OF DICARBOXYLIC ACIDS AND METHODS OF COATING THEREWITH

Borivoj Richard Franko-Filipasic, Niagara Falls, N. Y., assignor to Pittsburgh Plate Glass Company, Allegheny County, Pa., a corporation of Pennsylvania No Drawing. Application September 13, 1954
Serial No. 455,800

8 Claims. (Cl. 260—45.4)

This invention relates to N-allylamides of alkyl dicarboxylic acids and it has particular relation to N, N, N', N'-tetrallylamides of such acids and to polymers and interpolymers thereof useful in the coating and casting arts.

It has heretofore been suggested to prepare resinous bodies from ethylenic compounds containing terminal $>C=CH_2$ groups attached to a negative radical. Typical examples of such materials comprise methyl acrylate and methyl methacrylate. Still other examples of such materials comprise acrylonitrile, styrene and similar bodies containing the foregoing $>C=CH_2$ groups attached to a negative radical. In general these resins are thermoplastic in nature and often they are softer than might be desired and are therefore subject to marring and scratching.

It has also been suggested to interpolymerize the foregoing monomeric compounds with polyesters of dihydric alcohols and dicarboxylic acids, such as maleic acid, containing alpha-beta ethylenic groups. The resultant interpolymers are thermoset and are harder than the homopolymers obtained from the monomers. However, the hardness still is not as great as might be desired and the chemical resistance, especially with respect to alkalis, is not as great as that of some of the other resins, such as those obtained by condensation reactions between formaldehyde and melamine.

The present invention contemplates the provision of monomeric compounds which contain a plurality of $>C=CH_2$ groups attached to nitrogens of an amide of a polycarboxylic acid and are adapted for polymerization by homogeneous addition between like molecules or by heterogeneous addition with polyesters of alpha-beta ethylenically unsaturated dicarboxylic acids. The products have very good resistance to the action of alkalies and, moreover, are often characterized concomitantly by high degrees of hardness and flexibility. The N, N, N', N'-tetrallylamides of dicarboxylic acids (notably the aliphatic dicarboxylic acids) and mixtures thereof with compatible polyesters of dihydric alcohols and alpha-beta ethylenic dicarboxylic acids are particularly valuable.

Dicarboxylic acids suitable for forming allylamides in accordance with the provisions of the present invention preferably comprise those acids in which the carboxyls are bridged together by alkyl or polymethyl groups containing from about 4 to about 10 or 12 carbon atoms. Adipic acid, which is also termed hexanedioic acid, constitutes an example. Still other examples comprise succinic acid, glutaric acid, azelaic acid, sebacic acid and various others. Arylene dicarboxylic acids, such as phthalic acid, isophthalic acid, terephthalic acid, may likewise be converted into N, N, N', N'-tetrallylamides.

Amines suitable for reaction to form the amides of this invention comprise diallylamine, dimethallylamine, and other amines containing an active hydrogen atom and at least one, and preferably two, allyl groups or similar groups containing a $>C=CH_2$ portion. Monoamines may also be employed, but are presently not preferred.

The present invention includes the allylamides and the use thereof in forming homopolymers and interpolymers useful in the coating, impregnating and casting arts, regardless of the method by which such amides are derived. However, a convenient method of preparing N, N, N', N'-tetrallylamides of dicarboxylic acids, such as N, N, N', N'-tetrallyladipamide, comprises reacting the corresponding diallylamide (preferably in excess) with a chloride of the corresponding dicarboxylic acid, such as adipyl chloride. The resultant product can be dissolved in appropriate solvents, spread as a film and baked to a hard, but flexible state. They can also be mixed with polyesters in the manner previously described and cast, or otherwise treated.

Application of the specific principles of the invention is illustrated by the following examples:

Example I

In accordance with this example, N, N, N', N'-tetrallyladipamide was prepared by mixing adipyl chloride in a proportion of 1 mole (183 grams) with about 5 moles (500 milliliters) of diallylamine. In the reaction, the acid chloride was added slowly to the diallylamine and the resultant mixture was refluxed for a period of one hour after the completion of the addition. The reaction product was dissolved in ether in a separatory funnel and was washed successively with water, aqueous hydrochloric acid and again with water. It was then dried with magnesium sulfate. The product obtained was a brownish liquid consisting essentially of the foregoing N, N, N', N'-tetrallyladipamide. It was compatible with vinyl butyral resin, with polyesters and other resins.

This material can be homopolymerized by baking and is useful for forming protective films upon various surfaces. For purposes of testing its capacity as a film forming material, it was mixed with 10 percent by weight (based on the mixture) of polyvinyl butyral designed to increase the body thereof and to give suitable flow characteristics to the material. Films were formed by dipping test panels of sheet steel in the solution and subsequently baking the test panels at 400° F. for 10 minutes. The resultant films were of a Sward hardness of 32, an impact resistance of approximately 48, of good flexibility and good resistance to the action of a 3 percent solution of sodium hydroxide. The material is a good coating medium for iron or steel.

The foregoing N, N, N', N'-tetrallyladipamide is also valuable as a monomer for interpolymerization with polyesters. In this capacity, it may in part or in toto replace styrene and other monomers of conventional type to provide polyesters of exceptional hardness and concomitantly of good flexibility.

The preparation of such an interpolymer is illustrated by the following example:

Example II

In accordance with this example, N, N, N', N'-tetrallyladipamide prepared as in Example I was mixed in 50–50 proportion by weight with a polyester of propylene glycol and a mixture of 4 moles of maleic acid and 1 mole of terephthalic acid. Mixing may be effected by fusing the resin at about 140° C. The polyester may contain an inhibitor of gelation, such as one of the quaternary ammonium salts (e. g., trimethylbenzyl ammonium chloride as disclosed in U. S. Patent 2,593,787, or 3-isopropyl catechol as disclosed in U. S. Patent 2,676,947). Subsequently, the mixture may be cooled and stored as long as may be desired.

The mixture was catalyzed with 1 percent by weight based upon the mixture of tertiary butyl perbenzoate. The resultant solution was poured into a mold and gelled at a temperature of about 200° F. Subsequently, it was cured at a temperature of about 300° F. until a hard, thermoset, stable casting was obtained. The mechanical properties of this casting were such as to indicate the value of the material in forming useful castings of various types.

*Example III*

It is to be recognized that tetrallyladipamide of Example I may be replaced by other tetrallylamides with considerable success. In this example, the tetrallyladipamide was replaced by a stoichiometrically equivalent amount of the N, N, N', N'-tetrallylamide of glutaric acid prepared and handled by the techniques of Example II. This material could be mixed with 10 percent by weight based upon the mixture of polyvinyl butyral and baked as in the preceding example to form films. Also it could be mixed in 50–50 proportion with the mixed propylene maleate-terephthalate polyester of Example I and cast and baked to provide a casting whose physical properties showed the utility of the material in the casting art.

*Example IV*

In accordance with this example, the N, N, N', N'-tetrallylamide of azelaic acid was substituted for the tetrallyladipamide in Example I. The tetrallylamide of azelaic acid could be prepared by the reaction of azelayl chloride with diallylamine. The N, N, N', N'-tetrallylazelaamide was susceptible of combining with polyvinyl butyral to provide a curable composition which could be baked when spread as a film, to a hard, flexible state. In like manner, it could be cast when mixed with a polyester and cured to a hard thermoset body of useful properties.

*Example V*

In accordance with this example, N, N, N', N'-tetrallylsebacamide is prepared by the techniques disclosed in Example I for the preparation of the corresponding tetrallyladipamide. The tetrallylsebacamide can be mixed with other resins and can be spread as a film and cured by baking at 400° F. to a hard, flexible, adherent state. Likewise, it can be mixed with polyesters, such as the mixed polyester of propylene glycol, and a mixture of maleic acid and terephthalic acid, such as is disclosed in Example I. The resultant solution can be cast and cured.

*Example VI*

In this example, the adipic acid of Example I is replaced by isophthalic acid. The tetrallylamide of isophthalic acid can be spread as a film and baked or can be mixed with a catalyst, such as tertiary butyl perbenzoate, in the manner disclosed in Example I, and cast and cured.

*Example VII*

In accordance with this example, the adipic acid of Example I is replaced by terephthalic acid and the corresponding tetrallylamide is prepared in accordance with the techniques of Example I. The terephthalamide can be spread as a film and baked or it can be mixed with a polyester and the resultant mixture can be cast and cured.

In the several examples preceding, it will be apparent that tertiary butyl perbenzoate may be replaced by other free radical initiator type catalysts, such as the peroxide of methyl ethyl ketone, preferably in a solution in dimethyl phthalate, or by ditertiary butyl peroxide or tertiary butyl hydroperoxide and others.

The polyester of propylene glycol and a mixture of 4 moles of maleic acid and 1 mole of terephthalic acid has been described for mixing with the amides. However, it will be apparent that this particular polyester may be replaced by stoichiometric amounts of other polyesters in which the glycol component may be diethylene glycol, dipropylene glycol, polyethylene glycol of a molecular weight of 200 to about 2000, 1,2-butylene glycol or mixtures thereof. The acid component may comprise fumaric acid, itaconic acid, citraconic acid and mixtures of these with acids free of ethylenic groups and being represented by phthalic acid, terephthalic acid, isophthalic acid or the aliphatic dicarboxylic acids, such as succinic acid, adipic acid, sebacic acid, azelaic acid and others. Where these latter acids which are free of ethylenic groups are employed in mixture with the alpha-beta ethylenic dicarboxylic acids, the proportions thereof with respect to the latter acids may vary, for example in a range of about 10 to 0.25 moles per mole of the alpha-beta ethylenic dicarboxylic acid.

The following constitutes a partial list of polyesters from which selection can be made in the several examples of this application.

1.

| | |
|---|---|
| Maleic acid | 1 mole. |
| Phthalic acid | 0.25 to 10 moles (e. g., 1 mole). |
| Propylene glycol | Equivalent to, or in slight excess of equivalency to the acids. |

2.

| | |
|---|---|
| Maleic acid | 1 mole. |
| Adipic acid | 0.25 to 10 moles (e. g., 1 mole). |
| Propylene glycol | Equivalent to, or in slight excess of equivalency to the acids. |

3.

| | |
|---|---|
| Maleic acid | 1 mole. |
| Succinic acid | 0.25 to 10 moles (e. g., 1 mole). |
| Propylene glycol | Equivalent to, or in slight excess of the acids. |

4.

| | |
|---|---|
| Maleic acid | 1 mole. |
| Sebacic acid | 0.25 to 10 moles (e. g., 1 mole). |
| Propylene glycol | Equivalent to, or in slight excess of the acids. |

5.

| | |
|---|---|
| Maleic acid | 1 mole. |
| Phthalic acid | 0.25 to 10 moles (e. g., 1 mole). |
| Diethylene glycol | Equivalent to, or in slight excess of the acids. |

6.

| | |
|---|---|
| Maleic acid | 1 mole. |
| Propylene glycol | 1 mole, of a slight excess thereof. |

7.

| | |
|---|---|
| Fumaric acid | 1 mole. |
| Phthalic acid | 0.25 to 10 moles (e. g., 1 mole). |
| Diethylene glycol | Equivalent to, or in slight excess of the acids. |

8.

| | |
|---|---|
| Itaconic acid | 1 mole. |
| Propylene glycol | 1 mole, or in slight excess thereof. |

The polyester components, preferably will be fusible and soluble and the acid value will be within the range of approximately 10 to 60, e. g., about 40 to 50.

The polyester should be fused in order to promote fluidity and ease of incorporation of the diallylamide of the dicarboxylic acid constituting the monomer. A temperature of about 140° C. is suggested as being appropriate for the incorporation. In some instances it may be desirable to incorporate into the polyester of the tetrallylamide of the dicarboxylic acid a gelation inhibitor, such as hydroquinone, tertiary butyl catechol, 3-isopropyl catechol or trimethylbenzyl ammonium chloride or other appropriate gelation inhibitors, many of which are well known in the art of forming interpolymers of alpha-beta ethylenic dicarboxylic acids with monomers, such as styrene, vinyl acetate and many others.

It will be appreciated that tetrallylamides of dicarboxylic acids, such as N, N, N', N'-tetrallyladipamide as disclosed in the several examples, may be mixed in part (e. g., in amounts of 20 to 80 percent by weight based on total monomers) with other monomers, such as styrene, divinyl benzene, methyl methacrylate, acrylonitrile, vinyl acetate or the like.

It is to be understood that the tetrallylamides of dicarboxylic acids, when mixed with other monomers, may be applied to surfaces of metals, such as iron or steel, and baked. The mixtures of monomers may also be incorporated with polyesters and employed in the formation of castings. In order to cure the mixtures, they may be heated to temperatures in a range of about 200° F. to 300° F. until a satisfactory degree of hardness is attained.

Tetrallylamides of dicarboxylic acids, e. g., tetrallyladipamide, either alone, or in admixture with monomers such as styrene, vinyl acetate, methyl methacrylate, acrylonitrile and others, may be employed to coat, or to impregnate fabrics or mats of fibers such as fiber glass, cotton, cellulose, asbestos or the like. In like manner, the mats may be coated or impregnated with mixtures of the tetrallylamides or mixtures thereof with other monomers and polyesters, such as the mixed polyester of maleic acid and terephthalic acid with propylene glycol as disclosed in the examples or with other polyesters as herein disclosed.

It is to be understood that the embodiments of the invention as herein given are by way of illustration and not by way of limitation. Those skilled in the art will appreciate that numerous modifications may be made therein without departure from the spirit of the invention or the scope of the appended claims.

I claim:
1. An interpolymerizable mixture of N, N, N', N'-tetrallyladipamide and a polyester of a dihydric alcohol and an alpha-beta ethylenically unsaturated dicarboxylic acid.
2. An interpolymerizable mixture of claim 1 in which the polyester further contains a dicarboxylic acid which is saturated.
3. A polymer of an N, N, N', N'-tetrallylamide of an aliphatic dicarboxylic acid.
4. A solid object coated with a hard, flexible film which is a polymer of N, N, N', N'-tetrallyladipamide.
5. An interpolymer of N, N, N', N'-tetrallyladipamide and a polyester of propylene glycol and maleic acid.
6. A method of coating a surface which comprises applying thereto a film of N, N, N', N'-tetrallyladipamide and baking the same to a hard but flexible state.
7. A method of coating a surface which comprises applying thereto a mixture of N, N, N', N'-tetrallyladipamide and a polyester of a dihydric alcohol and an alpha-beta ethylenic dicarboxylic acid and baking the same to a hard, flexible state.
8. A method of coating a surface which comprises applying thereto a film of N, N, N', N'-tetrallylamine of a dicarboxylic acid of a class consisting of succinic acid, adipic acid, sebacic acid, glutaric acid, azelaic acid, phthalic acid, isophthalic acid, and terephthalic acid and baking the film at about 400° F. to a hard, flexible state.

References Cited in the file of this patent
UNITED STATES PATENTS

| | | |
|---|---|---|
| 2,084,626 | Tabern | June 22, 1937 |
| 2,290,675 | D'Alelio | July 21, 1945 |
| 2,598,664 | Kropa | June 3, 1952 |

OTHER REFERENCES

Chemical Abstracts, volume 32, page 2916 (1938).
Chemical Abstracts, volume 34, page 6707 (1940).
Beilsteins Handbuch der Organischen Chemie (4th edition), volume 4, pages 209 and 218 (1922).